United States Patent [19]

Siebold

[11] 3,884,073

[45] *May 20, 1975

[54] DEACTIVATOR MECHANISM FOR AUTOMATIC TEMPERATURE COMPENSATOR

[75] Inventor: Howard E. Siebold, Libertyville, Ill.

[73] Assignee: Liquid Controls Corporation, North Chicago, Ill.

[*] Notice: The portion of the term of this patent subsequent to Apr. 20, 1991, has been disclaimed.

[22] Filed: June 9, 1971

[21] Appl. No.: 151,459

[52] U.S. Cl. ................................................. 73/233
[51] Int. Cl. ............................................. G01f 1/08
[58] Field of Search....................... 73/233, 227, 230

[56] References Cited
UNITED STATES PATENTS
3,299,705  1/1967  Shallenberg et al. ................. 73/233

Primary Examiner—Jerry W. Myracle
Attorney, Agent, or Firm—Edmond T. Patnaude

[57] ABSTRACT

A clutch is connected between the input and output shafts of an automatic temperature compensator and a control member is connected to the clutch and to an idler gear connected between the compensating mechanism and the output shaft so that actuation of the control member deactivates the compensator by disconnecting the compensating mechanism from the output shaft and connecting the input shaft directly to the output shaft.

7 Claims, 6 Drawing Figures

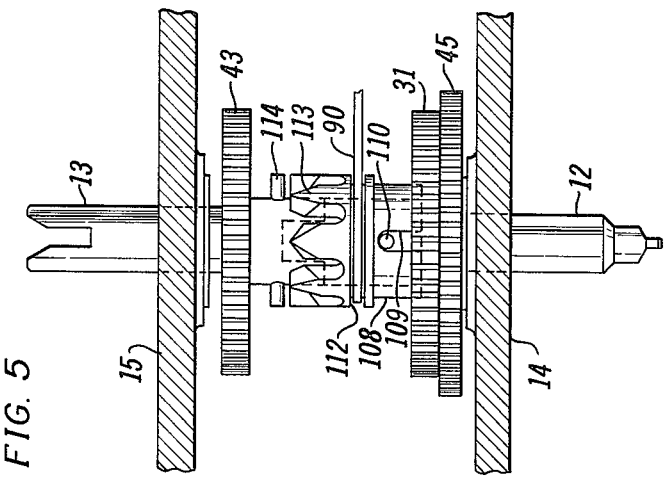
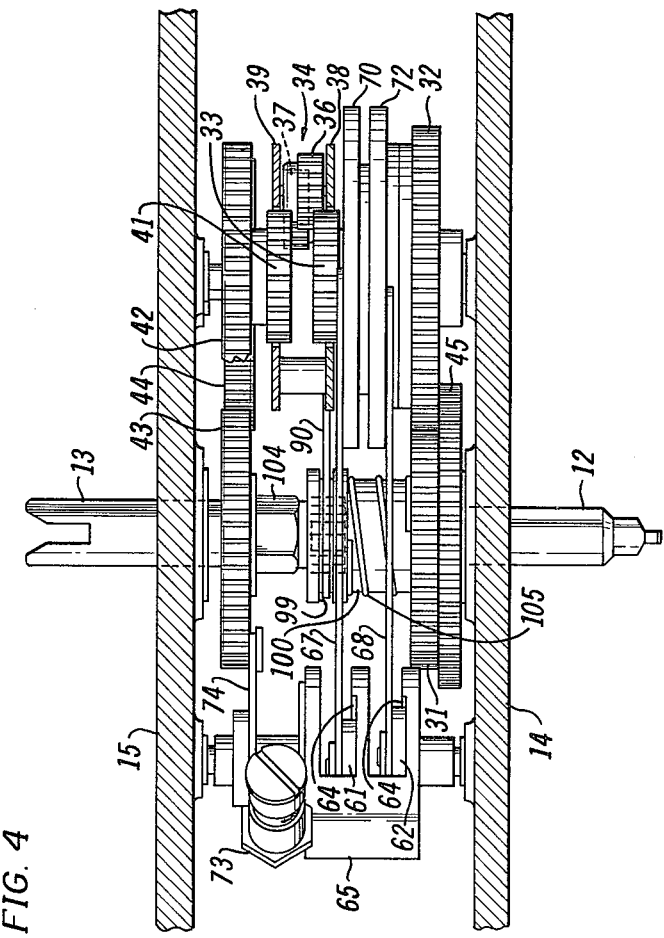

DEACTIVATOR MECHANISM FOR AUTOMATIC TEMPERATURE COMPENSATOR

The present invention relates to automatic temperature compensators, and it relates more particularly to such a device for deactivating the compensator without essentially changing the load on the associated meter.

In order to compensate for changes in volume caused by variations in the temperature of a liquid passing through a volumetric meter, it is the usual practice to interconnect an automatic temperature compensating device between the meter and a counter or register. Such a device is thus driven by the meter and has an input-output ratio inversely proportional to the ratio of the actual volume metered to the volume of the same quantity of liquid at the standard temperature of 60°F., whereby the counter provides a temperature compensated volumetric reading. One such device is described in U.S. Pat. No. 3,299,705 and the present invention constitutes an improvement thereof.

In order to test the associated meter to determine the accuracy thereof, it is necessary to deactivate the automatic temperature compensator. Various methods have been devised for this purpose but in no case have they been entirely satisfactory. For example, the compensator may be adjusted for a coefficient of thermal expansion of zero, so as to provide a compensation of zero irrespective of the temperature of the product being metered during the test. Similarly, the liquid being metered can be maintained at the standard temperature of 60°F. However, with both of these methods any error caused by malfunction of the compensating mechanism is added to the meter output making the results indefinite. Another method is to completely disconnect the automatic temperature compensator from the meter. This, however, changes the torque load on the meter thereby altering its accuracy from that which obtains under normal operating conditions.

Therefore, an object of the present invention is to provide a new and improved method and means for deactivating an automatic temperature compensator without essentially changing the torque load on the associated meter.

Another object of the present invention is to provide a new and improved deactivating mechanism suitable for use in an automatic temperature compensator of the type described in U.S. Pat. No. 3,299,705.

Briefly, the above and further objects may be realized in accordance with the present invention by providing means for directly interconnecting the input and output shafts of the automatic temperature compensator and disconnecting the output of the compensating mechanism thereof from the output shaft while maintaining the input shaft connected to the compensating mechanism. As a consequence, the torque load required to drive the compensating mechanism is carried by the meter output, whereby the torque load on the meter during the test is essentially the same as under normal operating conditions but any malfunction of the automatic temperature compensator does not affect the reading displayed by the counter.

Further objects and advantages and a better understanding of the present invention may be had by reference to the following detailed description taken in connection with the accompanying drawings, in which:

FIG. 4 is a side elevational view of a portion of the compensator mechanism particularly showing the lockout clutch of the present invention;

FIG. 5 is a view similar to that of FIG. 4 showing an alternative embodiment of the invention.

Figure 1:
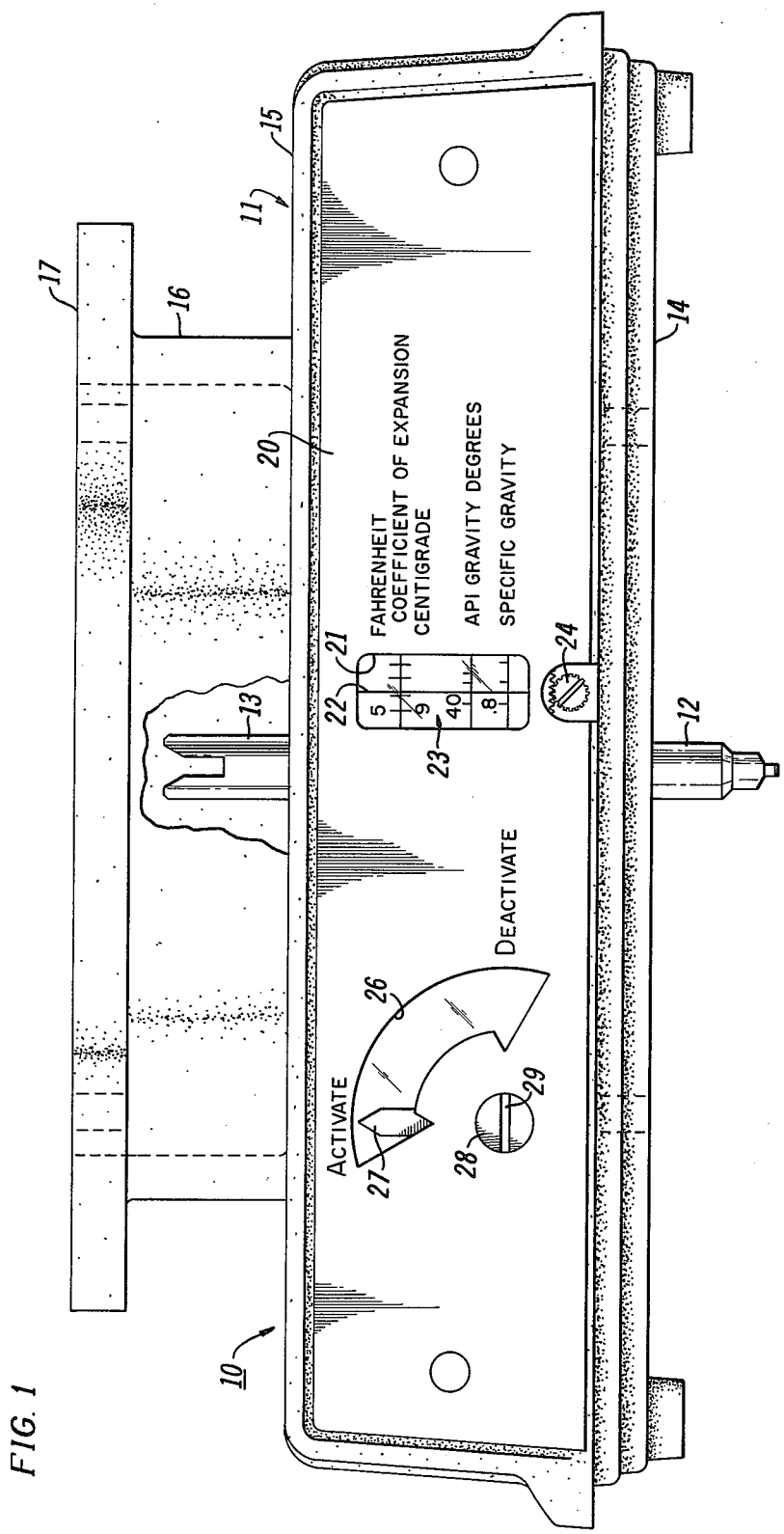
FIG. 1 is a front elevational view of an automatic temperature compensator embodying the present invention.

Referring now to the drawings and particularly to FIG. 1 thereof, there is shown an automatic temperature compensator 10 including a generally rectangular housing 11 which is adapted to seat directly on a volumetric meter and on the top of which a mechanical counter or register is adapted to seat. A centrally disposed input shaft 12 depends from the bottom of the housing 11 and an output shaft 13 aligned with the shaft 12 extends upwardly from the top of the housing 11. The housing 11 includes a generally rectangular base plate 14 and a cover 15 suitably attached thereto as by bolts (not shown). A circular mounting ring 16 which may be integral with the cover 15 surrounds the shaft 13 and is provided with an annular mounting flange 16 at the top. A face plate 20 is mounted on the front of the cover 15 and includes a window 21 having a vertical index line 22 thereover and through which a dial plate 23 may be observed. An adjusting gear 24 is accessible through the plate 20 and is used to enter into the compensator the coefficient of expansion of the particular liquid being metered by the associated meter. The dial plate 23 is suitably coupled by appropriate gearing to the adjustment gear 24 and includes three separate scales respectively for coefficient of expansion in centigrade, API gravity degrees and specific gravity. Different industries commonly use different ones of these coefficients, all of which are directly related to one another as provided on the respective scales on the dial 23.

The face plate 20 also includes an arcuate window 26 through which may be observed a pointer 27 which, together with associated mechanism within the unit is movable between the illustrated activate position and a deactivate position by means of a rotatable member 28 having a screw driver slot 29 therein. When in the activate position, the automatic temperature compensator 10 is activated to rotate the output shaft 13 by a temperature compensated amount in response to rotation of the input shaft 12. When in the deactivate position the automatic temperature compensator mechanism is deactivated and the output shaft 13 is directly coupled to the input shaft 12 so that no compensating factor is added to the output from the meter. In essence, therefore, the meter directly drives the counter. It will be understood by those skilled in the art that suitable means such as apertured screw-in cap plugs are provided over the adjustment members 28 and 24 to prevent unauthorized operation thereof. Such plugs are generally threaded with a sealing wire.

Figure 2:
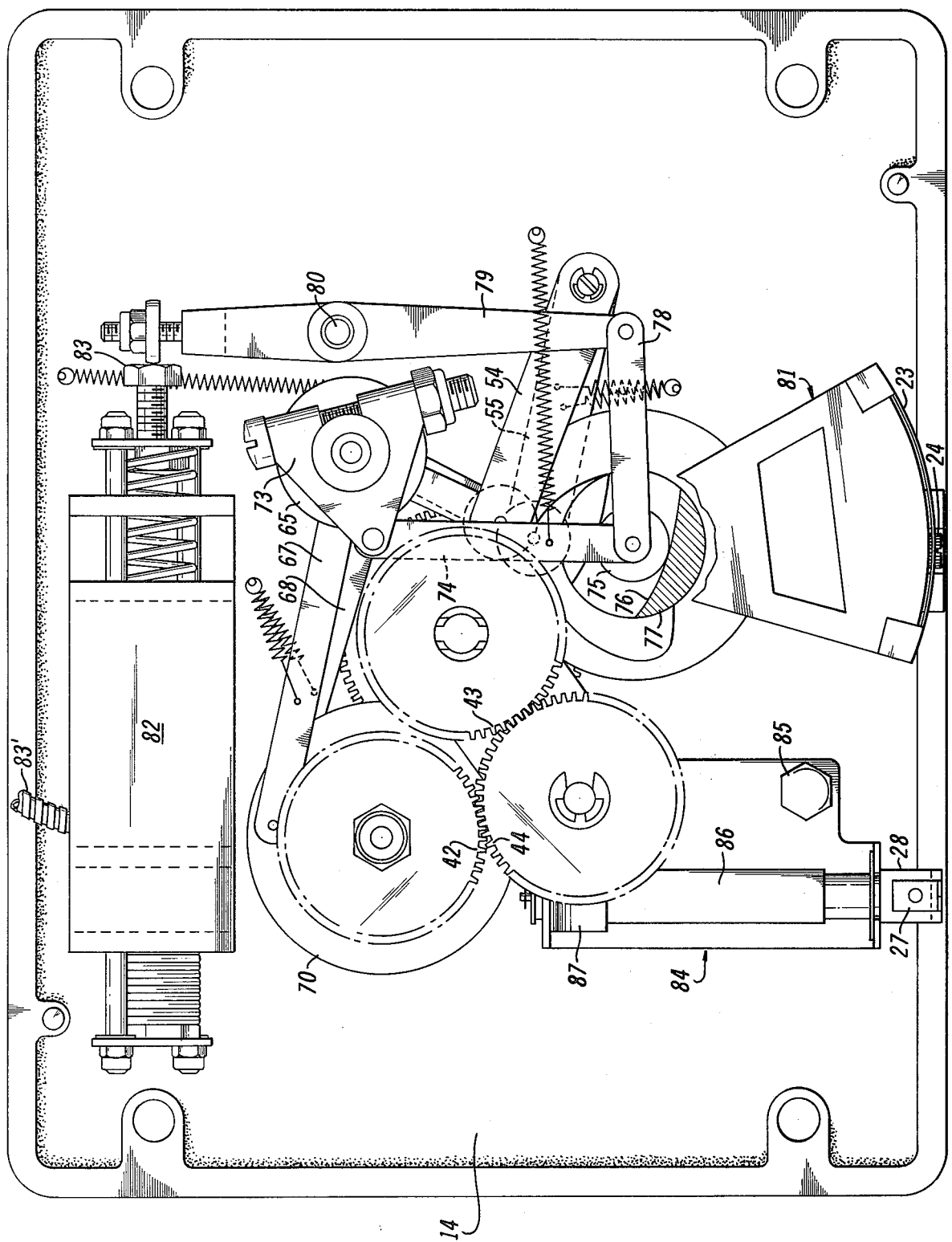
FIG. 2 is a top plan view of the compensator of FIG. 1 with the cover removed.
Figure 3:
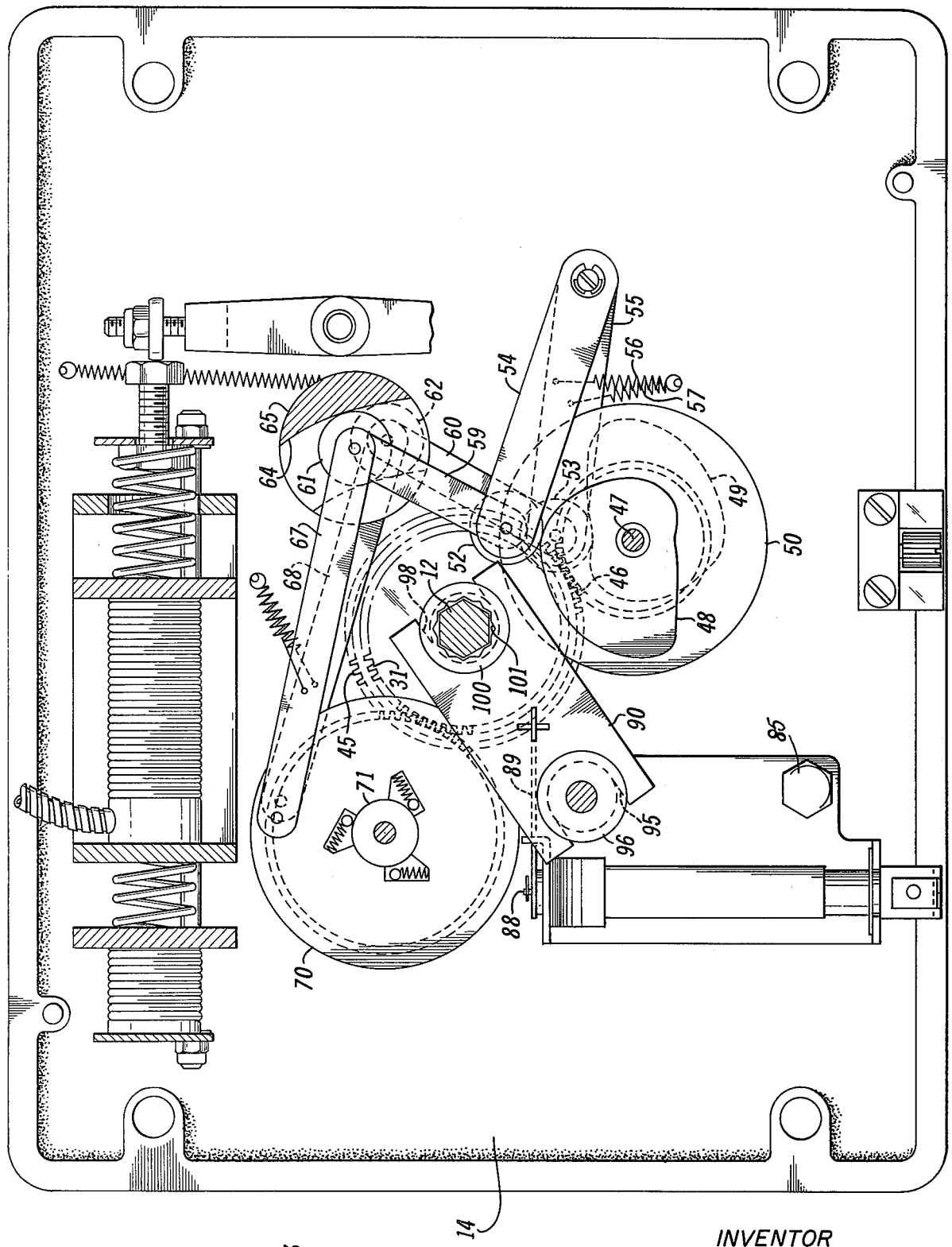
FIG. 3 is a horizontal sectional view of the compensator of FIG. 1.

Referring particularly to FIGS. 2, 3 and 4, the input shaft 12 is journaled in the base plate 14 and has a spur gear 31 fixed thereon for driving a spur gear 32. The gear 32 is fixed to a shaft (not shown) to which is also fixed a sun gear 33 of a planetary differential gear train 34. The sun gear 33 is thus directly driven by the shaft 12 and rotates at an angular velocity proportional to the angular velocity of the input shaft 12. A pair of intermeshed planetary gears 36 and 37 are respectively rotated on shafts mounted at their ends in a differential cage assembly including a lower plate 38 and an upper plate 39. The plates 38 and 39 are fixed together. The gear 36 mates with the sun gear 33 and the gear 37 mates with and drives an output gear 41 fixed to a drive gear 42 which drives a spur gear 43 fixed to the output shaft 13 through an idler gear 44. As thus far described it will be seen that when the differential cage including the plates 38 and 39 is held stationary, the output shaft 13 is directly driven by the input shaft 12 through the just described gear train in the drive ratio determined by such gear train. It will be understood by those skilled in the art that this is not ordinarily a one to one drive ratio but rather is at one end or the other of the operating range of the system.

Also fixedly connected to the input shaft 12 is a spur gear 45 which may be integral with the gear 31 and which drives a pinion gear 46 (FIG. 3) fixedly connected to a shaft 47 on which a pair of cams 48 and 49 are mounted. The cams 48 and 49 are mounted on the top and bottom sides of a support plate 50 also attached to the shaft 47. Accordingly, the cams 48 and 49 are rotated in proportion to the speed of rotation of the input shaft 12. A pair of rollers 52 and 53 respectively mounted on a pair of pivotable linkage arms 54 and 55 are biased by a pair of springs 56 and 57 against the peripheral surfaces of the cams 48 and 49 to reciprocate a pair of linkage arms 59 and 60 which are also rotatably attached to the respective rollers 52 and 53. A pair of rollers 61 and 62 are rotatably mounted respectively on the linkage arms 59 and 60 and ride in upper and lower arcuate grooves 64 in a rotatable block 65 (FIG. 4). The rollers 61 and 62 are respectively connected by means of a pair of linkage arms 67 and 68 to a pair of clutch plates 70 and 72 which are connected through a conventional Sprague one-way drive to a shaft 71 which is fixed to and preferably forms an integral part of the differential cage plate 38.

It may thus be seen that the angular position of the block 65 and more particularly the arcuate grooves 64 therein controls the stroke of the linkage arms 67 and 68 and as is more fully described hereinafter controls the compensating factor which is added to the rotation of the input sun gear 73. For this purpose, a clevis arm 73 (FIGS. 2 and 4) is fixedly attached to the block 65 and a linkage arm 74 is pivotally connected to the clevis 73 and has a roller 75 mounted at the other end thereof. The roller 75 is rollably mounted in an arcuate groove 76 in a rotatable control block 77 which is angularly adjustable by the adjustment gear 24. A pie-shaped member 81 is fixed to the block 77 and has an upstanding arcuate face on which the scales of the dial 23 as best shown in FIG. 1 are printed. Also pivotally attached to the roller 75 is an arm 78 pivotally attached at its other end to a lever 79 pivotally mounted on a pintle 80. The angular position of the lever 79 on the pintle 80 is under the control of a temperature responsive bellows assembly 82 which is connected to a conventional bulb (not shown) by a flexible tube 83. The bellows assembly 82 is completely described in the heretofore mentioned U.S. Pat. No. 3,299,705 and positions an output member 83' in an axially position proportional to the temperature of the liquid being metered. The block 77 together with the associated mechanism including the roller 75 thus angularly positions the clevis 73 in proportion to the product of the temperature of the liquid being metered and the coefficient of expansion as entered into the compensator by the input gear 24. The temperature compensator 10 has been described thus far with the activate-deactivate control in the activate position.

Broadly stated, in accordance with the present invention the gear 42 which is driven by the differential mechanism 34 is, in the deactivate position, decoupled from the gear 43 on the output shaft 13 by lifting the idler gear 44 out of engagement with both of the gears 42 and 43 and simultaneously connecting the input shaft 12 directly to the output shaft 13. In this manner the various gear trains and the linkages making up the automatic compensating mechanism remain coupled to and are driven by the input shaft 12 but are disconnected from the output shaft 13. Accordingly, any inaccuracies in the operation thereof are not transmitted to the output shaft 13 nor incorporated in the reading thereof.

Considered in greater detail, the activate-deactivate control member 28 on which the pointer 27 is mounted is pivotally mounted in a bracket 84 suitably secured to the base plate 14 as by means of a bolt 85. The member 28 has a central body section 86 which is square in cross section to cooperate with a flat spring 87 providing a detent for locking the adjustment member 28 in either the activate position as shown, or in the deactivate position at 90° relative thereto. A drive pin 88 extending parallel to but offset from the axis of rotation of the control member 28 provides a crank which is connected through a crank arm 89 to a horizontally disposed plate 90. An upstanding rearwardly disposed ear 91 of the bracket 84 is provided with a pair of rearwardly bent lugs 92 and 93 providing a slot through which the arm 89 extends. The lugs 92 and 93 provide a pair of fulcrum surfaces about which the arm 89 rocks in response to rotation of the control member 28. It may thus be seen that in the activate position as illustrated, the plate 90 is in its lowermost position and in the deactivate position the plate 90 is in its uppermost position.

The plate 90 is slotted at one end to fit in an annular groove in a hub 96 of the idler gear 44 so that in the upper position of the plate 90 the idler gear 44 is held upwardly out of engagement with the gears 42 and 43 but in the lower activate position of the plate 90, the idler gear 44 couples the gear 42 to the gear 43.

Figure 6:
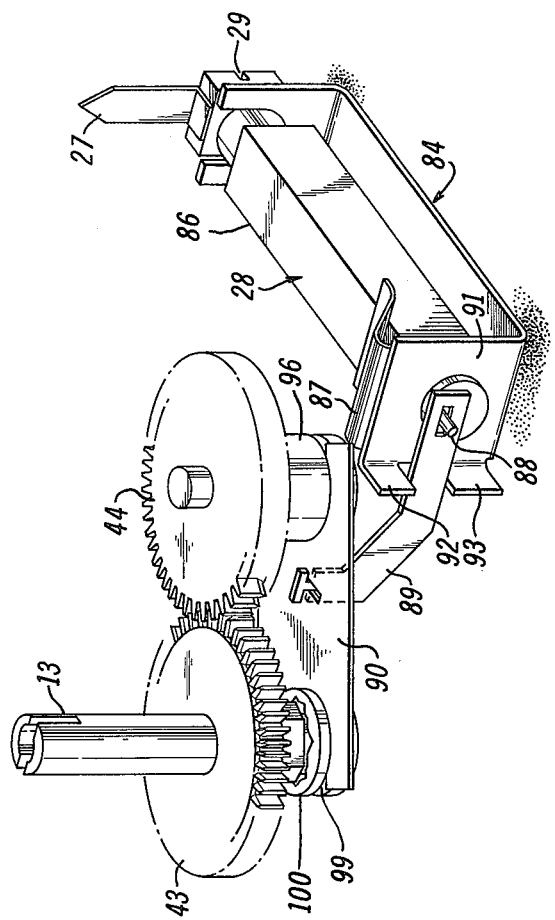
FIG. 6 is a perspective view of the deactivating control mechanism of the present invention.

The opposite end of the plate 90 is also provided with a slot 98 which is received in an annular goove 99 in a sleeve 100 axially slidable on the shaft 12. The sleeve 100 is provided with an irregular counterbore 101 which mates with a hexagonal upper end portion of the input shaft 12. The counterbore 101 also mates with a similar hexagonally shaped head portion 104 at the lower end of the output shaft 13. When the plate 90 is in an elevated position, the counterbore 101 in the sleeve 100 receives both the lower head portion 104 of the output shaft 13 and the upper head portion of the input shaft 12 thereby to directly connect the shafts 12 and 13 together. This is, as previously described, the deactivate position of the compensator. In the activate position as illustrated in FIG. 4, for example, the plate 90 is in the lower position wherefore the sleeve 100 is below and disconnected from the hexagonal lower end 104 of the shaft 13. In order to facilitate operation of the activate-deactivate control, a coil spring 105 is compressed between the upper surface of the gear 91 and a downwardly facing shoulder on the sleeve 100. Similarly, a coil spring is mounted over the shaft on which the gear 44 is mounted to bias the gear 44 in the upward disconnect position. Also, the lower edges of the teeth of the idler gear 44 are tapered as shown in FIG. 6 to facilitate meshing of the gear 44 with the gears 42 and 43 when the gear 44 is lowered from the deactivate to the activate position.

Referring to FIG. 5 there is illustrated an alternative clutch construction wherein parts identical to those illustrated in FIG. 4 are identified by the same reference numerals. In this embodiment of the invention a sleeve 108 is slidably mounted on the input shaft 12 above the gear 31 and is provided with a slot 109 which receives a drive pin 110 fixed on the shaft 12 and extending transversely therefrom. The plate 90 extends into an annular goove 112 in the sleeve 108 for moving the sleeve between upper and lower positions in response to rotation of the activate-deactivate control member 28. The upper end of the sleeve 108 is provided with a plurality of spaced apart teeth 113 and the output shaft 13 is provided with a transverse pin 114 receivable in the slots between the teeth 113. When the plate 90 is in the illustrated activate position, the pin 114 is above the teeth 113 and the output shaft 13 is not coupled through the clutch mechanism to the input shaft 12. When, however, the plate 90 is in the upper deactivate position, the teeth 113 engage the pin 114 on the output shaft 13 thereby to provide a direct coupling between the input and output shafts 12 and 13.

The present invention is an improvement over and may be used in conjunction with the automatic temperature compensator shown and described in U.S. Pat. No. 3,299,705 issued Jan. 24, 1967 and assigned to the assignee of the present invention. Therefore, in order to facilitate a more complete understanding of the construction and operation of the compensating mechanism per se with which this invention is adapted to be used, reference may be made to the said patent.

While the present invention has been described in connection with particular embodiments thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. An automatic temperature compensator comprising
   a meter,
   a counter,
   an input shaft adapted to be driven by said meter,
   an output shaft adapted to drive said counter,
   compensating means driven by said input shaft and responsive to the temperature of the product being metered for driving said output shaft, and
   deactivating means for disconnecting said compensating means from said output shaft and connecting said input shaft directly to said output shaft while said compensating means remains connected to said input shaft.

2. A device according to claim 1 wherein said deactivating means comprises
   a pair of clutch members respectively connected to said input and output shafts, and
   a control member connected to one of said clutch members for movement thereof between connected and disconnected positions with the other of said clutch members.

3. A device according to claim 2 wherein
   said input and output shafts are in mutual alignment, and
   said one of said clutch members is axially slidable on one of said shafts.

4. A device according to claim 2 further comprising
   detent means for holding said control member in the clutching and declutching positions thereof.

5. A device according to claim 4, wherein
   an idler gear connects said compensating means to a driven gear on said output shaft, and
   said deactivating means moves said idler gear axially to disconnect said compensating means from said output shaft.

6. A device according to claim 5 wherein said control member is a rotatable shaft and said deactivating means comprises
   a plate connected at its ends to said one of said clutch members and to said idler gear, and
   said control member is connected to said plate by an eccentric and a linkage member.

7. A device according to claim 5 comprising
   spring means urging said one of said clutch members into said connected position.

* * * * *